(12) United States Patent
Yang et al.

(10) Patent No.: US 6,684,907 B2
(45) Date of Patent: Feb. 3, 2004

(54) LOOSE-FILL INSULATION CONDITIONING DUCT

(75) Inventors: Alain Yang, Bryn Mawr, PA (US); Ken Knapp, Norristown, PA (US)

(73) Assignee: CertainTeed Corporation, Valley Forge, PA (US)

( * ) Notice: Subject to any disclaimer, the term of this patent is extended or adjusted under 35 U.S.C. 154(b) by 25 days.

(21) Appl. No.: 10/051,468

(22) Filed: Jan. 18, 2002

(65) Prior Publication Data

US 2003/0136156 A1 Jul. 24, 2003

(51) Int. Cl.[7] ................................................ F15D 55/00
(52) U.S. Cl. ......................... 138/37; 138/39; 138/45; 138/46
(58) Field of Search ......................... 138/37, 45, 46, 138/39

(56) References Cited

U.S. PATENT DOCUMENTS

| | | | |
|---|---|---|---|
| 4,296,164 A | | 10/1981 | Bemis et al. |
| 4,756,957 A | | 7/1988 | Kielmeyer |
| 4,909,817 A | | 3/1990 | Gill et al. |
| 5,092,366 A | * | 3/1992 | Sakamoto .................... 138/37 |
| 5,505,027 A | * | 4/1996 | Young ........................ 52/169.5 |
| 5,683,810 A | | 11/1997 | Babbitt et al. |
| 5,975,141 A | * | 11/1999 | Higazy ........................ 138/45 |
| 6,116,284 A | * | 9/2000 | Murray et al. ............... 138/39 |
| 6,206,050 B1 | * | 3/2001 | Kelley et al. ............... 138/129 |
| 6,336,474 B1 | * | 1/2002 | Kelley et al. ............... 138/129 |
| 6,474,364 B2 | * | 11/2002 | Ta et al. ..................... 138/37 |

OTHER PUBLICATIONS

Consumer Energy Information : EREC Fact Sheets, "Loose-Fill Insulations", Oct. 10, 2001, trade literature, 10 pages.
Certain Teed Corp. Certain Teed Insulation Homeowner Products InsulSafe® 4 Fiber Glass Insulation, Jul. 6, 2001, trade literature, 20 pages.

* cited by examiner

Primary Examiner—Patrick Brinson
(74) Attorney, Agent, or Firm—Duane Morris LLP

(57) ABSTRACT

A method and apparatus for conditioning loose-fill insulation including an elongated tubular cylinder having a plurality of internal blades positioned in a helical configuration. Large nodules of glass fibrous material pass through the conditioning cylinder and are combed into smaller, more uniform sizes, thus allowing a more uniform additive application further downstream in the manufacturing process. The addition of a tangential airflow to the conditioning cylinder facilitates the combing process by adding a tangential force to move the nodules down the cylinder.

25 Claims, 3 Drawing Sheets

US 6,684,907 B2

LOOSE-FILL INSULATION CONDITIONING DUCT

FIELD OF THE INVENTION

The invention relates to the production of mineral fiber material, and more particularly, to materials such as glass fibers. Specifically, the invention relates to making loose fibrous material of a type suitable for the manufacture of fiber glass products including loose-fill, blown-in type insulation.

BACKGROUND OF THE INVENTION

Loose-fill insulations are either produced as—or broken down into—shreds, granules, or nodules. These small particles form fluffy materials that conform to the spaces in which they are installed. Loose-fills are most commonly sold in bags and are blown into building cavities using special equipment.

Loose-fill insulations are well suited for places where it is difficult to install other types of insulation, for example, irregularly shaped areas, around obstructions (such as plumbing stacks), and in hard-to-reach places. They can be installed in either enclosed cavities such as walls or unenclosed spaces such as attics. Blown-in loose-fills are particularly useful for retrofit situations because, except for the holes that are sometimes drilled for installations, they are one of the few materials that can be installed without greatly disturbing existing finishes.

One common type of loose-fill, fiber glass loose-fill insulation is spun from molten glass into fibers. The glass is typically melted in high-temperature gas or electric furnaces and often includes about 20% to 30% of recycled glass content.

There are several performance characteristics to consider when selecting a loose-fill insulation material. Among the most important to consider are insulating capacity, weight, convective heat loss, settling and loss of insulating capacity. A material's resistance to heat flow is expressed as its R-value. The higher the R-value, the better the material insulates, and the lesser the thickness required to achieve a desired result.

Loose-fill insulations are produced by a variety of methods known in the art. For example, a common method of production involves supplying streams of molten glass to conventional rotary fiberizers to form veils of glass fibers. At this point, an additive, usually an anti-static organic agent, is applied to the glass fibers. These veils of glass fibers are typically collected onto conveyors, then pass though equipment, such as a flail which cuts and shreds them into fiber nodules. From that point, the nodules are pneumatically conveyed to other conditioning equipment where special additives such as dust reduction oil are applied, then through a nodulator for further conditioning and finally to packaging equipment.

The processing steps of cutting and shredding loose-fill fiber glass insulation are often very rough processing and not efficient. Higher performance cutting and shredding of loose-fill insulation is cost prohibitive, requiring the manufacturer to purchase and maintain separate and expensive machinery to produce the desired form of the insulation. Another problem with conventional processing techniques is that they tend to produce a dispersed glass fiber nodule size. That is, the nodule size generally is not uniform. A more uniform nodule size would permit a better additive distribution, which would in turn optimize the products performance as an insulation.

Improved methods of and apparatus for forming loose-fill fiber glass insulation materials with less dispersed glass fiber nodule size distribution are therefore desirable.

SUMMARY OF THE INVENTION

The present invention provides for a system for conditioning glass fiber nodules, the system including a conditioning duct having an elongated cylindrical tube with a plurality of blades disposed in a helical configuration around the cylindrical tube. The blades extend radially inward from an inside surface of the cylindrical tube and serve to break apart the veils of glass fibers to provide a more uniform nodule size distribution than otherwise obtained using conventional techniques. The conditioning duct is in preference installed between the flail and the nodulator in order to offer an efficient fiber cutting and shredding, although it could be installed in other areas of pneumatic transport duct.

An air inlet may also be incorporated into the conditioning duct, whereby pressurized air enters the inlet and provides a tangential airflow through the duct. The air flowing into the duct via the inlet induces a rotation in the glass fiber nodules disposed in the duct and serves to push the nodules through the blades.

Another aspect of the system lies in a method for processing loose-fill insulation is provided and includes the step of: passing loose-fill insulation material through an elongated duct having a plurality of internally disposed blades in a helical configuration. Tangential airflow may also be provided to the duct to impart a rotational effect on the insulation materials for improved processing through the duct.

BRIEF DESCRIPTION OF THE DRAWINGS

Other aspects, advantages and novel features of the invention will become more apparent from the following detailed description of the invention when considered in conjunction with the accompanying drawings wherein.

DETAILED DESCRIPTION

Figure 1:
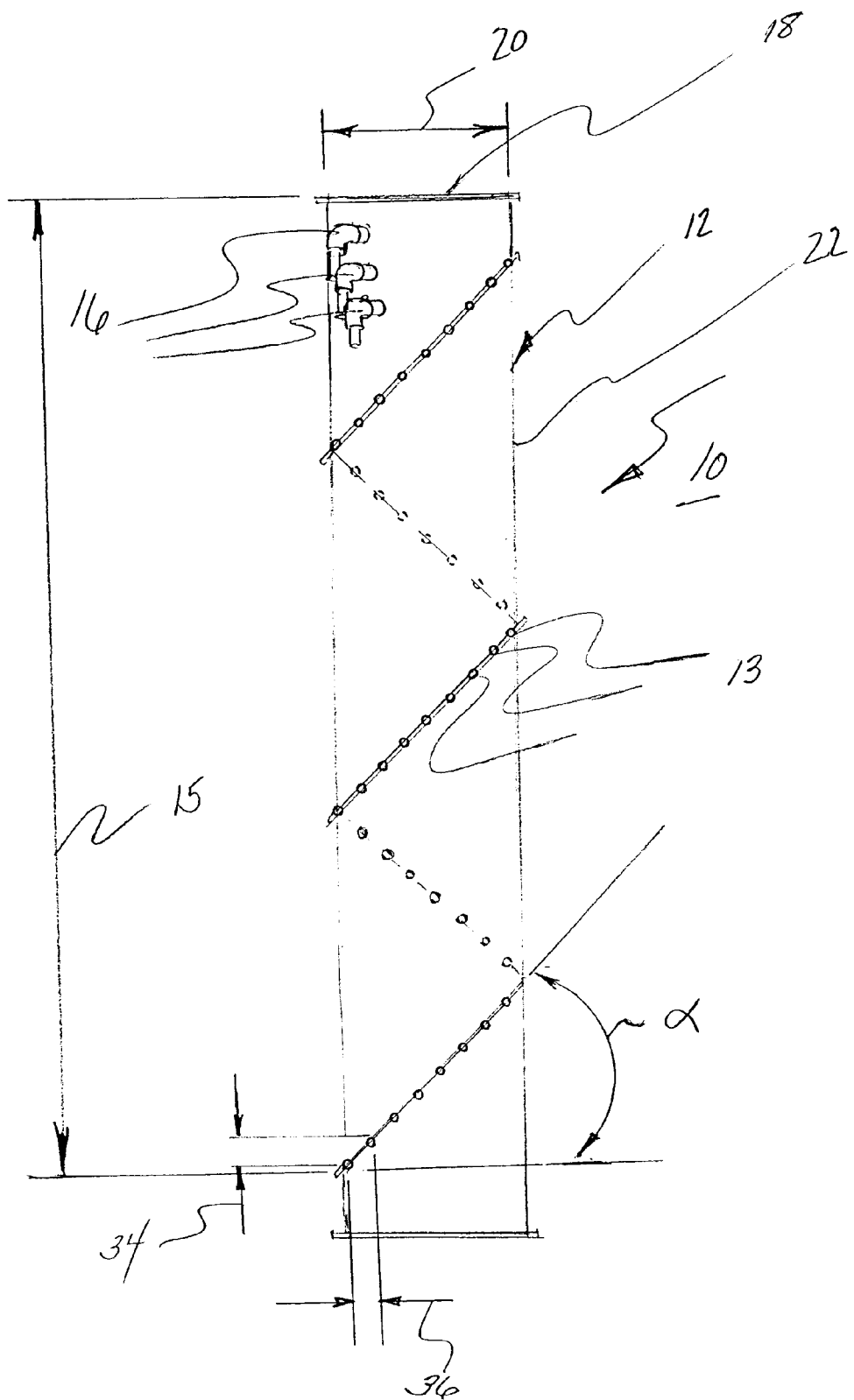
FIG. 1 is a front elevational diagram of an exemplary embodiment of the conditioning duct, illustrating the air inlets and the helical positioning of blades within the duct.
Figure 2:
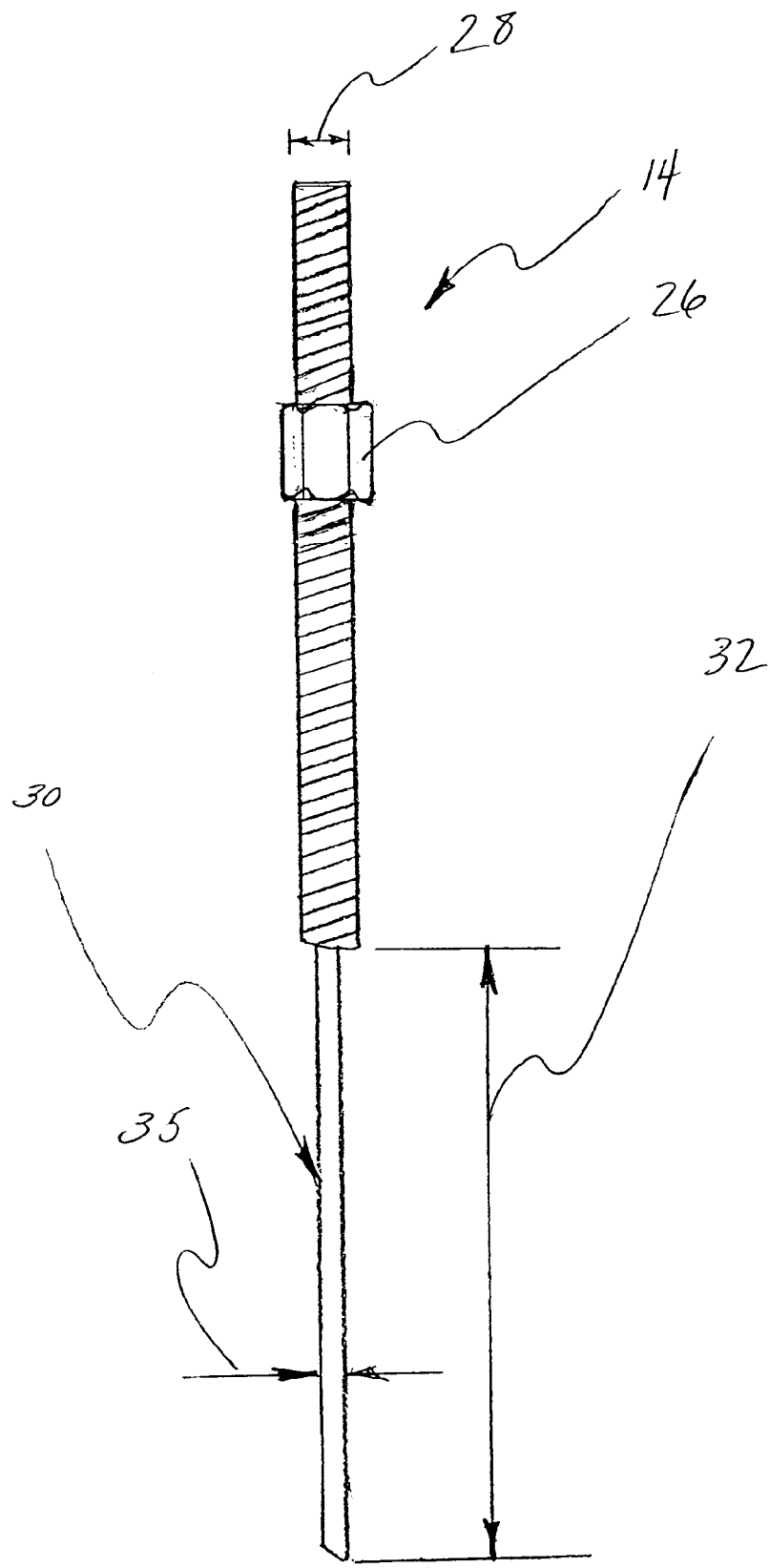
FIG. 2 is a front elevational view of an exemplary individual blade.

FIGS. 1 and 2 illustrate a preferred embodiment of the loose-fill insulation conditioning system 10. The system 10 includes a conditioning duct 12 having a plurality of radially disposed processing blades 14. The blades 14 are attached to the inside of the duct 12 in a helical configuration and "comb" insulation materials such as, for example, fiber glass nodules that are processed through the conditioning duct 12. Air conduits 16 may be provided at an upstream end 18 of the duct 12 to provide tangential airflow to the interior of the duct 12 to facilitate processing of loose-fill insulation.

Referring still to FIGS. 1 and 2, conditioning duct 10, according to a preferred embodiment, is an elongated, cylindrical, tubular, steel member having a diameter 20 of between about 12 inches and 24, inches more preferably between 14 inches and 22 inches and most preferably between 16 inches and 20 inches. The duct 10 has a length 15 of between about twelve feet (12 ft) and twenty feet (20 ft) and is preferably sixteen feet (16 ft) long. The duct wall 22 includes a plurality of through holes 13 for radially mounting processing blades 14. The mounting holes 13 are positioned on a line forming a helix, along the length of the duct 10, and the line preferably being oriented at an angular inclination alpha (a) of about forty-five (45) degrees from a plane perpendicular from the longitudinal axis of the duct 12. In other words, the helix has a pitch of about 45 degrees. Consecutive mounting holes 13, and corresponding blades 14, have a longitudinal spacing 34 of between about 1 inch and 3 inches, and are preferably spaced 2 inches apart. The circumferential spacing 36 of consecutive blades is between about 0.5 inch and 4 inches, more preferably between 1 inch and 3 inches, and most preferably between 1.5 inches and 2.5 inches. Variations in pitch ranging from between about thirty (30) degrees and about seventy (70), degrees and more preferably between 35 and 50 degrees, are contemplated within the scope of the invention, and may be desirable depending on a variety of factors including the size, type and spacing of blades 14, airflow and pressure in the duct 12, and the material processed.

Tangential air flow may be applied through a plurality of air conduits 16 located near the upstream end of conditioning duct 12, to facilitate fiber nodule movement and processing through the duct 12. In the embodiment shown in FIG. 1, tangential airflow is applied through three air conduits 16, each having a one inch (1") diameter.

FIG. 2 shows an exemplary processing blade 14, having an attachment means, which may be a threaded rod 24 having a nut 26 threaded thereon. The threaded rod 24 has a diameter 28 that is slighter smaller than the diameter of mounting holes 13, thereby permitting insertion of the threaded rods 24 in corresponding mounting holes 13. Once inserted, a second nut (not shown) may be applied to each threaded rod to detachably secure each processing blade 14 in position. When blade 14 is fastened to the duct wall 12, the blade 14 is oriented perpendicular to the longitudinal axis of the duct 12. The portion of the blade that is exposed to and "combs" the insulation, is referred to herein as the combing portion 30. The combing portion is 30, in the embodiment shown, is a straight blade having a length 32 which is between 0.5 inches and 4 inches, more preferably between 1 inch and 3 inches and most preferably 1.5 and 2.5 inches, and a generally rectangular cross-section, although other configurations are feasible and contemplated within the scope of the invention, including, but not limited to, an "ice-pick" like blade configuration. It will also be apparent to those skilled in the art that other conventional fasteners may alternatively be employed.

Figure 3:
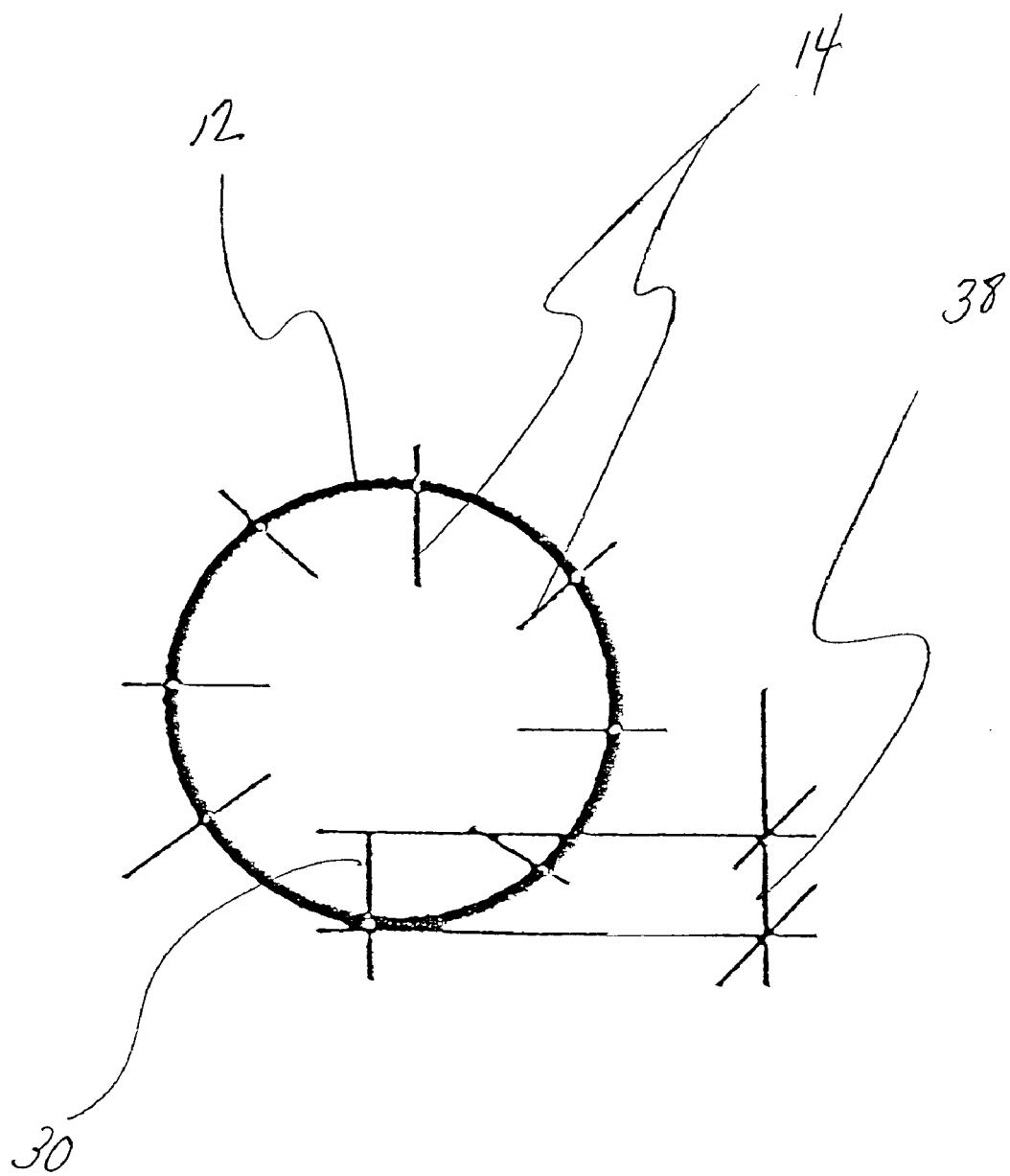
FIG. 3 is a diagram showing the blade orientation in the conditioning duct, as viewed in cross-section.

FIG. 3 shows the blade orientation in the conditioning duct 12, as viewed in cross-section. Multiple blades 14 can be seen positioned within the conditioning duct 12. The blades 14 extend generally radially inward from the duct wall 22, but are eccentrically advanced from a radial direction in order to facilitate processing of the losse-fill insulation and movement of the insulation through the conditioning duct 12 in concert with the tangential airflow.

In operation, glass fiber nodules are introduced at the upstream end 18 of duct 12. The longitudinal axis of the duct 12 has a vertical orientation. Thus, loose-fill insulation may be in-part, gravity fed into the upstream end 18 of the duct 12. A positive pressure of about 4 psi is maintained in the duct 12 during processing of the loose-fill insulation. In addition, tangential airflow may be introduced near the upper (inlet) end 18 of the duct to impart a rotational effect on the loose-fill insulation. Advantageously, the rotational air and the helical blade configuration together impart a cyclone-like rotation of the glass fiber nodules, which "combs" the large glass fiber nodules into smaller more uniform ones, as the materials pass through the conditioning duct 12 and blades 14. Small uniform nodules facilitate a more uniform additive distribution during subsequent processing.

The following results (Table 1) were achieved employing a plurality of helically configured blades each having a two inch (2") blade length 32 and a one-eighth inch (⅛") blade width 35. Consecutive blades were circumferentially spaced three inches (3") apart and longitudinally spaced three inches (3") apart. The blades were mounted in a conveying duct 12, having an 18" diameter along a 16 ft. length.

TABLE 1

| ICD Trial # | Direction of blow hose | R-Values Obtained |
| --- | --- | --- |
| STD | MD* | 28.23 |
| STD | MD | 26.90 |
| STD | Reverse MD | 30.75 |
| STD | Reverse MD | 29.09 |
| | Average | 28.74 |
| ICD | MD | 28.9 |
| ICD | MD | 28.68 |
| ICD | Reverse MD | 30.26 |
| ICD | Reverse MD | 29.92 |
| | Average | 29.44 |

*MD = Mandrel Direction

The foregoing test results, performed after one month of storage of the conditioned loose-fill insulation, show an improvement in R-value for loose-fill insulation processed in accordance with the system and methods described herein ("ICD"). The thermal resistance was tested and obtained in accordance with ASTM C518 at a mean temperature of 75° F.

The following results (Table 2) were achieved employing a plurality of helically configured blades each having a two inch (2") blade length 32 and a one-eighth inch (⅛") blade width 35. Consecutive blades were circumferentially spaced two inches (2") apart and longitudinally spaced two inches (2") apart.

TABLE 2

| Trial Number | Individual R-value | Average R-value of two tests |
| --- | --- | --- |
| STD-1 and STD-7 | 31.03 | 31.36 |
| | 31.68 | |
| | 31.62 | 31.65 |
| | 31.67 | |
| STD Average | | 31.50 |
| ICD-2 | 31.30 | 31.35 |
| | 31.40 | (−0.15) |
| ICD-3 | 31.57 | 31.45 |
| | 31.32 | (−0.05) |
| ICD-4 | 32.27 | 31.96 |
| | 31.65 | (+0.45) |
| ICD-5 | 31.16 | 31.7 |
| | 32.33 | (+0.20) |
| ICD-6 | 32.08 | 31.98 |
| | 31.87 | (+0.45) |

Trial Conditions for Table 2:
No. 1 & 7: standard production conditions
No. 2: Blades 2" length and spaced 2" longitudinally and 2" circumferentially
No. 3: same as No. 2 with additional 4 PSI air flow through 3 pipes of 1" diameter
No. 4: Blades 2" length and spaced 1" longitudinally and 2" circumferentially
No. 5: same as No. 4 and with 4 PSI tangential air flow through 3 pipes of 1" diameter.
No. 6: Blades 2" length and spaced 3" longitudinally and 3" circumferentially The foregoing test results show an improvement in R-value for loose-fill insulation processed in accordance with the system and methods described herein ("ICD"), as compared to loose-fill insulation processed using conventional techniques ("STD"). The thermal resistance was tested and obtained in accordance with ASTM C518 at a mean temperature of 75° F.

The loose-fill conditioning system is an efficient way of obtaining an improved nodule size distribution having little cost to install and virtually no cost to maintain, which in turn permits a better distribution of additives. The system ultimately results in loose-fill insulations having improved insulating properties vis-a-vis loose-fill insulations formed using conventional techniques.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A conditioning duct for conditioning material comprising:
    an elongated cylindrical tube; and
    a plurality of blades disposed inside the tube, the blades extending inward from an inside surface of the cylindrical tube; and
    the blades being positioned in a helix configuration in order to impart rotation to the material inside the tube.

2. The conditioning duct of claim 1 further comprising:
    an air inlet providing a tangential air flow into the duct, which imparts rotation to the material.

3. The conditioning duct of claim 1 wherein the air inlet comprises a plurality of conduits communicating with the cylindrical tube.

4. The conditioning duct of claim 1 wherein the helix has configuration is a helix having a pitch between thirty (30) and seventy (70) degrees, more preferably between thirty-five (35) and fifty (50) degrees and most preferably of forty-five (45) degrees.

5. An apparatus for conditioning loose-fill insulation comprising:
    an elongated cylindrical tube;
    a plurality of blades disposed inside the tube, the blades extending inward from an inside surface of the cylindrical tube; and
    an air inlet providing a tangential airflow into the duct, the tangential airflow imparting rotation to the loose-fill insulation in the duct.

6. The system apparatus of claim 5 wherein the blades are positioned in a helix configuration in the cylindrical tube.

7. The system apparatus of claim 5 wherein the air inlet comprises a plurality of conduits communicating with the cylindrical tube.

8. The apparatus of claim 5 wherein the blades have a combing blade length between about 1.5 inches and 3 inches.

9. The system apparatus of claim 5 wherein the circumferential spacing between consecutive blades is between about 1.5 inches and 3 inches.

10. The apparatus of claim 5 wherein the blades are positioned in a helix configuration in the cylindrical tube and the helix configuration is a helix having a pitch of forty-five (45) degrees.

11. The system apparatus of claim 3 wherein the diameter of the elongated cylindrical tube is between about 14 inches and bout 18 inches.

12. The apparatus of claim 5 wherein the length of the elongated cylindrical tube is between about twelve feet and about twenty feet.

13. A method of conditioning a loose-fill insulation material comprising the steps of:
    passing the loose-fill insulation material through an elongated duct having a plurality of internally disposed blades in a helical configuration; and
    providing tangential air flow into the duct to impart rotation to the loose-fill insulation material.

14. A fiber glass loose-fill insulation product conditioned to have an improved R-value by the application of the system method of claim 13.

15. An apparatus for conditioning loose-fill insulation comprising:
    an elongated cylindrical tube;
    a plurality of blades disposed inside the tube, the blades extending inward from an inside surface of the cylindrical tube; and
    the blades being positioned in configuration in the cylindrical tube.

16. The apparatus of claim 15 wherein each of the blades has a combing blade length between 1.5 and 3 inches.

17. The apparatus of claim 15 wherein the circumferential spacing between consecutive blades is between about 0.5 inches and 3 inches.

18. The apparatus of claim 15 wherein the helix configuration is a helix having a pitch between thirty (30) and seventy (70) degrees, more preferably between thirty-five (35) and fifty (50) degrees and most preferably of forty-five (45) degrees.

19. The apparatus-of claim 15 wherein the helix configuration is a helix having a pitch of forty-five (45) degrees.

20. The apparatus of claim 15 wherein the diameter of the elongated cylindrical tube is between about 14 inches and about 18 inches.

21. The apparatus of claim 15wherein the length of the elongated cylindrical tube is between about twelve feet and about twenty feet.

22. The apparatus of claim 15 wherein each of the blades has a combing blade length between 0.5 inch and 4 inches, more preferably between 1 inch and 3 inches and most preferably between 1.5 and 2.5 inches.

23. The apparatus of claim 15 wherein the circumferential spacing between consecutive blades is between 0.5 inch and 4 inches, more preferably between 1 inch and 3 inches and most preferably between 0.5 and 2.5 inches.

24. The apparatus of claim wherein the helix has a pitch between thirty (30) and seventy (70) degrees, more preferably between thirty-five (35) and fifty (50) degrees and most preferably of forty-five (45) degrees.

25. The apparatus of claim 15 wherein the diameter of the elongated cylindrical tube is between 12 inches and 24 inches, more preferably between 14 inches and 22 inches and most preferably between 16 inches and 20 inches.

* * * * *